United States Patent [19]
Brusson et al.

[11] Patent Number: 5,524,431
[45] Date of Patent: Jun. 11, 1996

[54] THRUST REVERSER WITH DOORS FOR JET AIRCRAFT ENGINE, THE DOORS BEING EQUIPPED WITH AN AUXILIARY FLAP

[75] Inventors: Jean-Pierre Brusson, Chaville; Jean-Pierre L. Jumel, Montesson, both of France

[73] Assignee: Societe de Construction des Avions Hurel-Dubois, Meudon La Foret, France

[21] Appl. No.: 324,578

[22] Filed: Oct. 18, 1994

[30] Foreign Application Priority Data

Oct. 22, 1993 [FR] France ............................ 93 12605

[51] Int. Cl.⁶ .................................................. F02K 1/70
[52] U.S. Cl. ............................ 60/226.2; 239/265.31
[58] Field of Search .......................... 60/230, 226.2, 60/229; 239/265.31, 265.29, 265.27, 265.25; 244/110 B, 12.5

[56] References Cited

U.S. PATENT DOCUMENTS

| | | | |
|---|---|---|---|
| 3,576,337 | 4/1971 | Gudde | 292/201 |
| 4,894,985 | 1/1990 | DuBois et al. | 239/265.29 |
| 4,914,905 | 4/1990 | DuBois et al. | 60/226.2 |
| 4,916,895 | 4/1990 | DuBois | 60/230 |
| 4,960,243 | 10/1990 | DuBois et al. | 239/265.29 |
| 5,003,770 | 4/1991 | Hurel-Dubois | 60/226.2 |
| 5,230,213 | 7/1993 | Lawson | 244/110 B |
| 5,243,817 | 9/1993 | Matthias | 60/226.2 |
| 5,255,850 | 10/1993 | Cockerham | 239/265.25 |
| 5,347,808 | 9/1994 | Standish et al. | 60/226.2 |

FOREIGN PATENT DOCUMENTS

1177864  1/1970  United Kingdom .

*Primary Examiner*—Timothy S. Thorpe
*Attorney, Agent, or Firm*—Young & Thompson

[57] ABSTRACT

The present invention relates to thrust reversers with doors for jet aircraft engines. The door (2) is equipped, on the internal face of its upstream end, with at least one auxiliary flap (8) articulated to the door and capable of being brought from a position away from the internal face of the door into a position against the latter, and locked in each of these positions by virtue of a control system with link rods (12, 17, 21, 19). The control system is actuated by virtue of its interaction with a stationary stop piece (23). Locking the flap (8) in each of its positions prevents vibration, and damage thereto.

11 Claims, 10 Drawing Sheets

THRUST REVERSER WITH DOORS FOR JET AIRCRAFT ENGINE, THE DOORS BEING EQUIPPED WITH AN AUXILIARY FLAP

The present invention relates to thrust reversers known as "tilting door thrust reversers" which are intended to equip engines of et aircraft including a fairing surrounding the engine unit and together with the latter forming an annular duct for the flow of the gases. In this type of reverser, a series of doors articulated to the fairing may move, under the action of a control cylinder, between a thrust-reversal position in which the doors are deployed so as to free, in the fairing, openings for diverting the gases while at least partially closing off the annular duct, and a cruise position in which the doors are non-obstructing in order to close the diversion openings and constitute part of the fairing.

more particularly, the present invention aims at an improvement in the reversers as described in FR-A-2,635,825 filed on 29 Aug. 1988 in the name of the Assignee and entitled "Thrust reverser for jet engine of the type having doors equipped with auxiliary flaps".

In this prior patent, the doors are equipped, on the upstream part (in the direction of flow of the gases) of their internal face with at least one auxiliary flap articulated to the inside of the door and intended, in the cruise position, to be moved away from the internal wall of the door to align itself with the external surface of the annular duct in order to allow the best aerodynamic flow conditions for the gases, while in the door-deployed position, said auxiliary flap is folded back against the internal wall of the door in order to allow the reversed gases to be discharged, the displacement of the auxiliary flap between these two positions being achieved by a means for controlling the flap interacting, at the moment of opening and closing the door, with a stop piece system carried by the stationary part of the fairing. In this known system, the auxiliary flap is locked when the door is in the non-obstructing position while in the door-deployed position it is brought back against the door by means of a low-power elastic-return means. This prior system exhibits the drawback of not holding the flap sufficiently rigidly, which flap, under the effect of the variations in pressure which are due to the flow of reversed gas, may tend to vibrate, which may lead to damage to the flap and/or to the door itself.

The invention proposes a simple solution making it possible to remedy this drawback by rigidly holding the flap with respect to the door in each of its two positions.

In order to do this, the reverser according to the invention is one wherein the means for controlling the flap is made up by a set of link rods comprising a first link rod which is articulated to the upstream end of the flap and attached by an articulation pin at the end of a second link rod itself articulated at its other end to the inside of the upstream end of the door, a third link rod articulated at one of its ends to the articulation pin between the first and second link rods, while its other end is articulated at the end of an actuating link rod which is articulated so that it can pivot about a fixed pin of the door, this actuating link rod providing the displacement of the set of link rods by its interaction with the stop piece system carried by the stationary part of the fairing, said set of link rods providing an immobilization of the flap in each of the two positions which it can assume, by extending, at the end of travel, beyond a neutral point between two of the consecutive link rods of the set of link rods.

The amount by which each of the neutral points between the two consecutive link rods of the set of link rods can be exceeded is limited by the actuating link rod bearing against travel-limiting stops integral with the door.

The auxiliary flap is held against the internal wall of the door when the door is in the deployed position, by the exceeding of a neutral point between the actuating link rod and said third link rod articulated to the end of said actuating link rod.

Conversely, the auxiliary flap is held in its position away from the internal wall of the door when the latter is in the non-obstructing position by the exceeding of a neutral point between said first and second link rods which are articulated, in the case of one of them, to the upstream end of the door and, in the case of the other, to the auxiliary flap.

According to one embodiment of the invention, the actuating link rod comprises, on either side of the pin via which it is articulated to the door, a first arm which is articulated to said third link rod of the set of link rods and a second arm which projects with respect to the upstream edge of the door and is intended to interact with said stop piece system, so that when the door is being opened or closed the interaction between the stop piece system and the actuating link rod gives rise to the displacement of the latter, which displacement actuates the set of link rods.

According to a second embodiment, the actuating link rod articulated to said stationary pin of the door, exhibit an arm attached by a linkage to a moving finger which is articulated to a stationary pin of the door and has one free end projecting with respect to the upstream edge of the door to interact with said stop piece system, said linkage being, on the one hand, articulated so that it can pivot on said arm of the actuating link rod and, on the other hand, articulated so that it can pivot to the moving finger at a point situated between the stationary pivot pin of the finger and the projecting free end of the latter, said linkage transmitting the movement from the finger to the actuating link rod.

The stop piece system carried by the stationary part of the fairing and with which the means for controlling the auxiliary flap (and more particularly the actuating link rod) interacts includes a bracket, part of which extends in the direction of the door to act as an arrester stop piece for the part of the means for controlling the flap which projects with respect to the upstream edge of the door, said bracket exhibiting, above its part forming a stop piece, a projecting snout which, when the door is being opened, acts on the actuating link rod of the flap to force it to tilt.

The projecting snout is preferably stationary with respect to the bracket. It is advantageously made up by a latch mounted so that it can tilt on a pin of the bracket and urged by a spring into the out position above the part of the bracket forming a stop piece.

Preferably, the free end of the latch has a concave shape ending in a bearing finger, this free end of the latch interacting and remaining in contact with the end of the projecting part of the means for controlling the flap during all of the manoeuvres at the beginning of opening and end of closing the door.

The bracket is advantageously mounted on the stationary part of the fairing by means of an elastic damper member allowing a slight excursion of the bracket.

The stop piece assembly exhibits certain degrees of freedom so that it can absorb the clearances which are indispensable for allowing the movements of opening and closing the door.

Other features of the invention will emerge in the course of the following description with reference to the appended drawings, in which.

Figure 1:
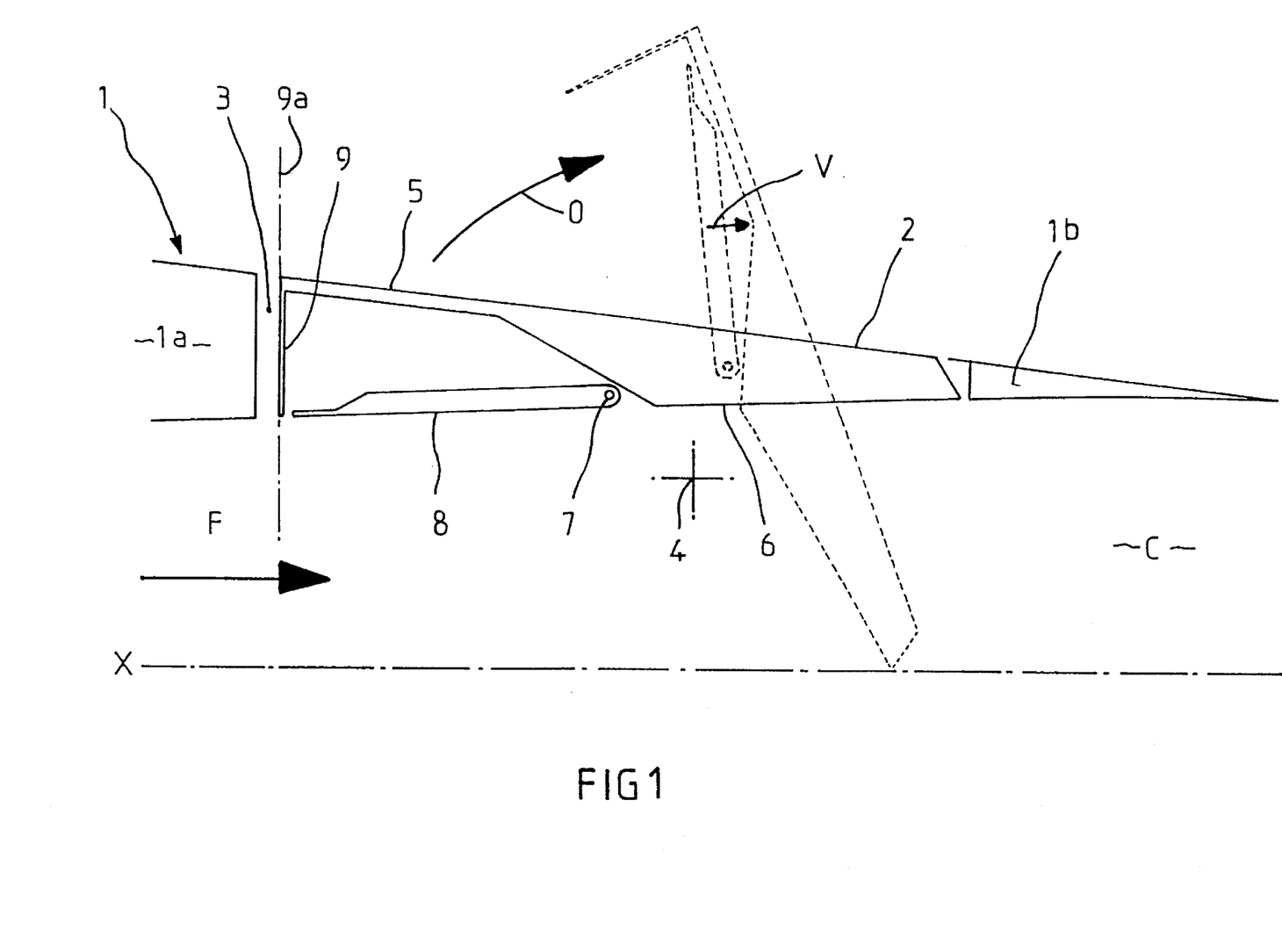
FIG. 1 is a diagrammatic view of a reverser door according to the invention, represented in its non-obstructing position (in continuous line) and deployed position (in broken line)

FIG. 1 diagrammatically shows a thrust reverser door equipped with an auxiliary flap as described in the aforementioned FR-A-2 635 825.

The axis of the engine, not represented, has been indicated as X-Y, and the annular fairing surrounding the latter and together with it forming an annular duct "C" as 1, the arrow F indicating the direction of flow of the stream of gas from upstream (to the left in the figure) to downstream (to the right in the figure) of the engine.

The fairing 1 exhibits a stationary part 1a–1b in which are formed openings 3 in which the reverser doors 2 are housed, distributed peripherally.

Each door 2 is articulated, about a pivot pin 4, to the stationary structure of the fairing so that it can move, in the direction of the arrow 0, under the action of a control cylinder (not represented) from a non-obstructing or cruise position, represented in continuous line in FIG. 1, in which the door 2 closes off the opening 3 and is aligned with the stationary part 1a–1b of the fairing, in order to allow the stream of gases to flow out from upstream to downstream, to a deployed or reversal position (represented in broken lines) in which each door 2, tilting about its pin 4, at least partially closes off the duct "C" and frees the opening 3, forcing the gas to escape laterally and forward, thus producing the reversal effect.

As seen in FIG. 1, and as is explained in the aforementioned FR-A-2 635 825, the door 2 includes an external skin or wall 5 and an internal skin or wall 6, the external skin 5 being extended, on the upstream edge side 9a of the door, by a spoiler 9 substantially perpendicular to the external skin 5. A moving auxiliary flap 8 is articulated about a pin 7 to the internal skin 6, this flap being intended, in the door non-obstructing position, to place itself in the extension of the internal skin 6 in order partially to constitute the outer wall of the duct "C" while in the door-deployed position, said flap 8 must be folded back in the direction of the arrow V against the external skin 5 of the door so as to allow the spoiler 9 to act as a deflector.

The displacement of the flap 8 between its two positions is obtained, according to a first embodiment represented in FIGS. 2a and 2b, by control means which will now be described in more detail and which is made up of a system of link rods comprising an actuating link rod 12, a first link rod 21, a second link rod 19 and a third link rod 17.

More precisely, in the internal angle formed by the external skin 5 and the spoiler 9 of the door 2 there is provided a gusset plate 10 in the middle part of which is formed a pin 11 supporting the actuating link rod 12, in the form of an L including, on either side of the pin 11, two arms 13 and 14, the arm 14 projecting beyond the spoiler 9 (in other words beyond the upstream edge 9a of the door 2) and carrying a roller 15 rotating about a pin 15a. The end of the arm 13 carries a pin 16 to which is articulated the end of the third link rod 17 articulated to a pin 18 which further joins, in a way so that they can pivot, the ends of the first and of the second link rods 19 and 21. The link rod 19 is articulated via its other end to a pin 20 integral with the gusset plate 10, while the link rod 21 is articulated about a pin 22 integral with the front part of the auxiliary flap 8. The pin 20 is located above the pin 11.

To the stationary part. 1a of the fairing 1 there is moreover fixed a stop piece assembly 23 including a fixing bracket 24 or sole plate, a lower plate 25 intended to act as a stop piece for the roller 15 of the link rod 12 and an upper finger or snout 26 forcing the link rod 12 to tilt about its pin 11 when the door is being opened, as will be described in more detail later.

Figure 2A:
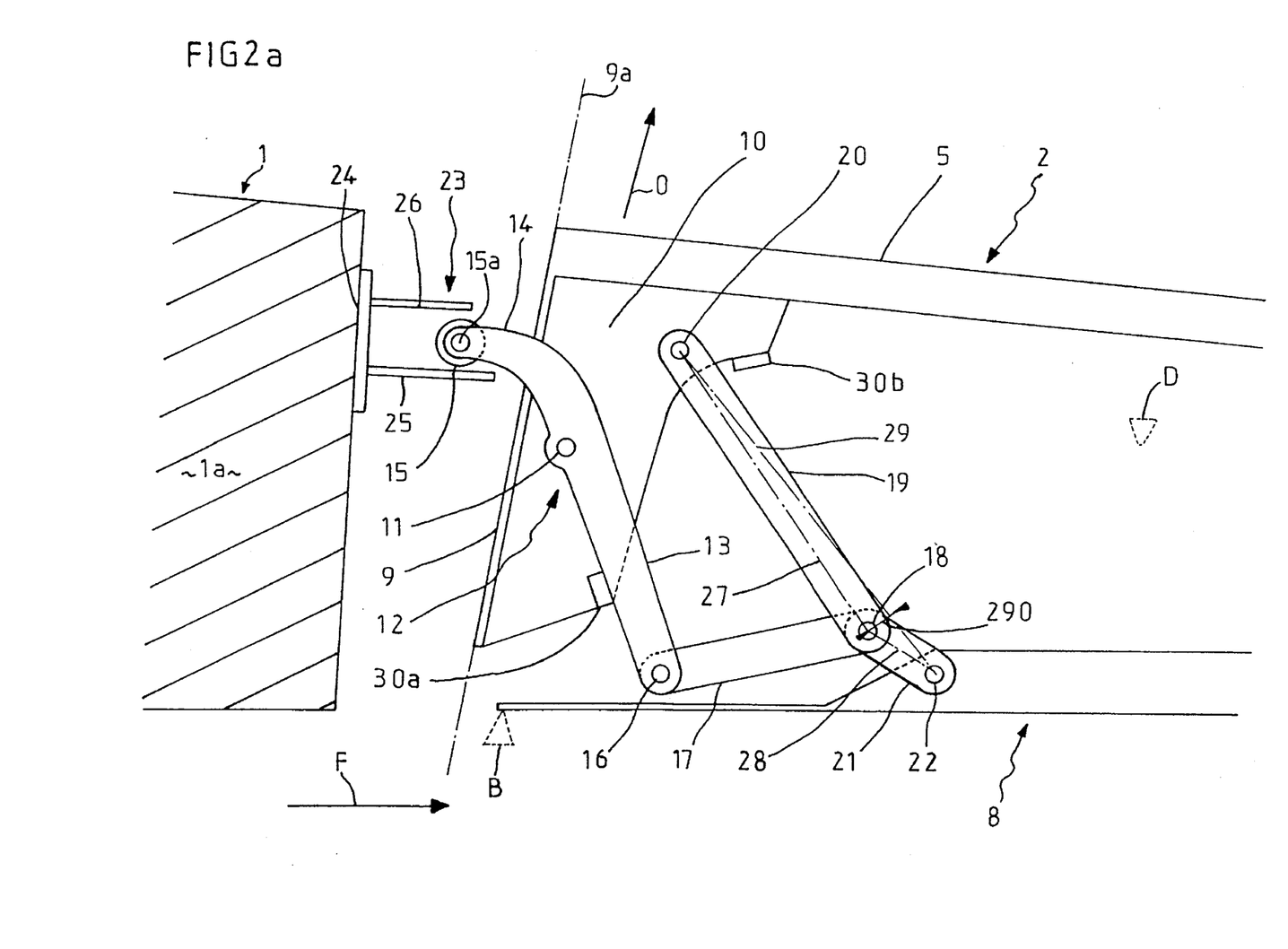
FIGS. 2a and 2b are views representing in detail the front of the door of FIG. 1 equipped with the auxiliary flap control mechanism according to a first embodiment of the invention, respectively in two extreme positions.
Figure 2B:
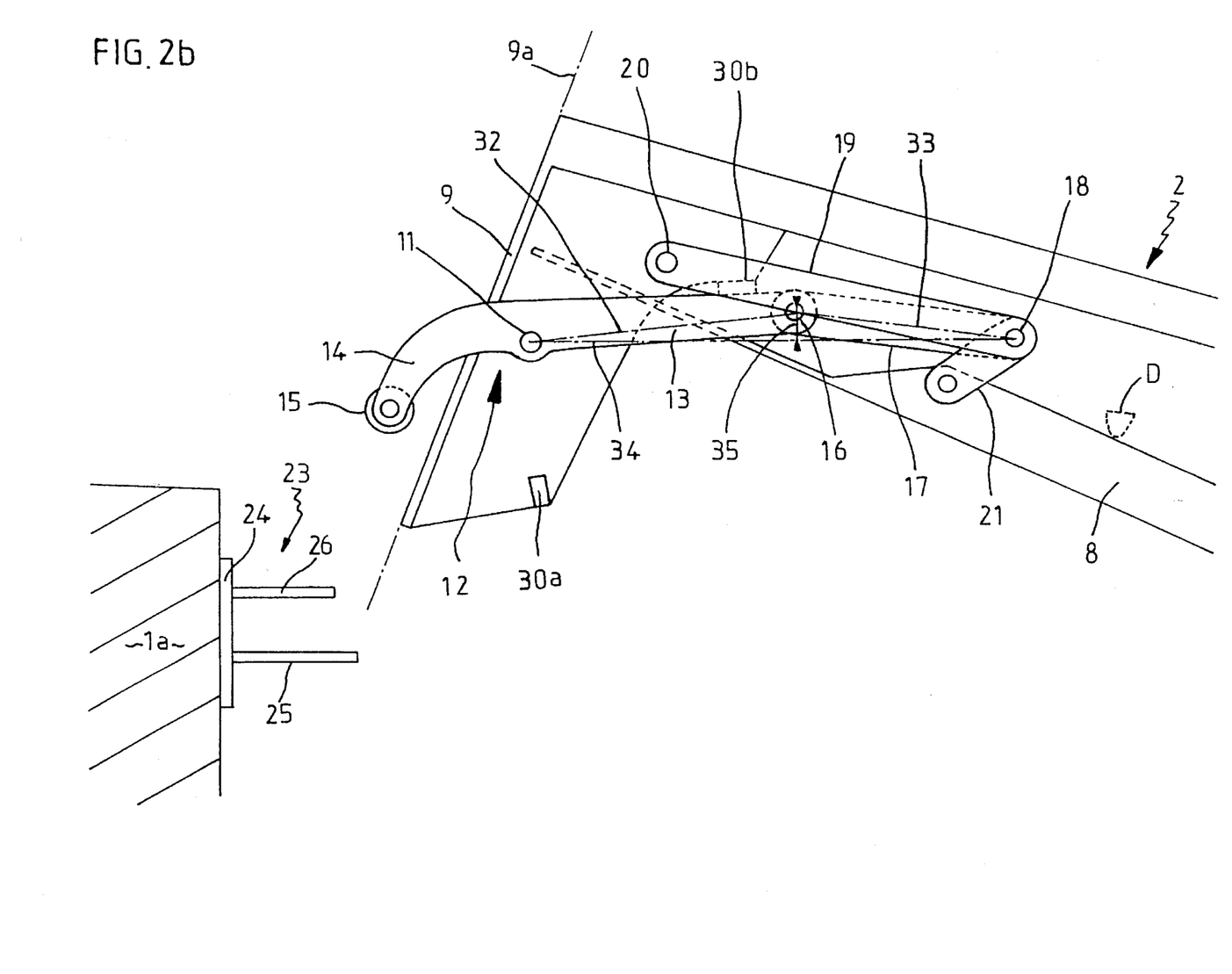

As seen in FIG. 2a, when the door 2, under the action of its cylinder (not represented) is brought into the non-obstructing position, he roller 15 of the actuating link rod 12 is held between the parts 25 and 26 of the stop piece system 23 and the arm 13 comes to bear against a stop piece 30a integral with the gusset plate 10. In this position, the longitudinal axes 27 and 28 of the link rods 19 and 21 form an angle with the line 29 joining the pins 20 and 22 of said link rods so that the pin 18 is offset, as represented at 290, with respect to the neutral point line which said line 29 constitutes. In this situation, the flap 8 is firmly immobilized in position.

The auxiliary flap 8 cannot be pushed back towards the door 2 because, to do so, it would have to make the pin 18 cross the neutral point line 29, which is forbidden by a stop piece B provided on the stationary structure 1 and against which the flap 8 comes to bear.

In contrast, as soon as one wishes to deploy the door 2 into the reversal position, the door cylinder acts on the door in the direction for opening. In this case, the roller 15 bears against the finger 26 of the stop piece system 23, whilst the door 2 is urged in the direction of the arrow 0, entraining the pin 11 with it. The link rod 12 therefore pivots relative to the door 2 and its pin 16 pushes back the link rod 17 which forces the pin 18 to cross the neutral point line 29. This movement continues until the arm 13 of the link rod 12 comes into abutment against an upper rest 30b of the gusset plate 10 (FIG. 2b).

In this position, the link rod 19 and the link rod 21 have folded the flap 8 back against the door 2, thus clearing the spoiler 9, the flap 8 coming into contact with a stop piece D integral with the door 2. The flap 8 is also firmly held in this non-obstructing position by virtue of the fact that the pin 16 connecting the arm 13 of the link rod 12 and the link rod 17 crosses the neutral point line embodied by the line 34 joining the pins 11 and 18, the longitudinal axis 32 of the arm 13 of the link rod 12 and the longitudinal axis 33 of the link rod 17 forming an angle such that the pin 16 is offset with respect to the neutral point line 34 as shown by the offset 35. The neutral point line 34 can be crossed in the opposite direction merely by virtue of the fact that, at the end of travel for closing the door, the roller 15 will come to bear against the stop piece system 23, forcing the link rod 12 to pivot in the clockwise direction in order to return the flap 8 to the position in solid line.

Figure 3A:
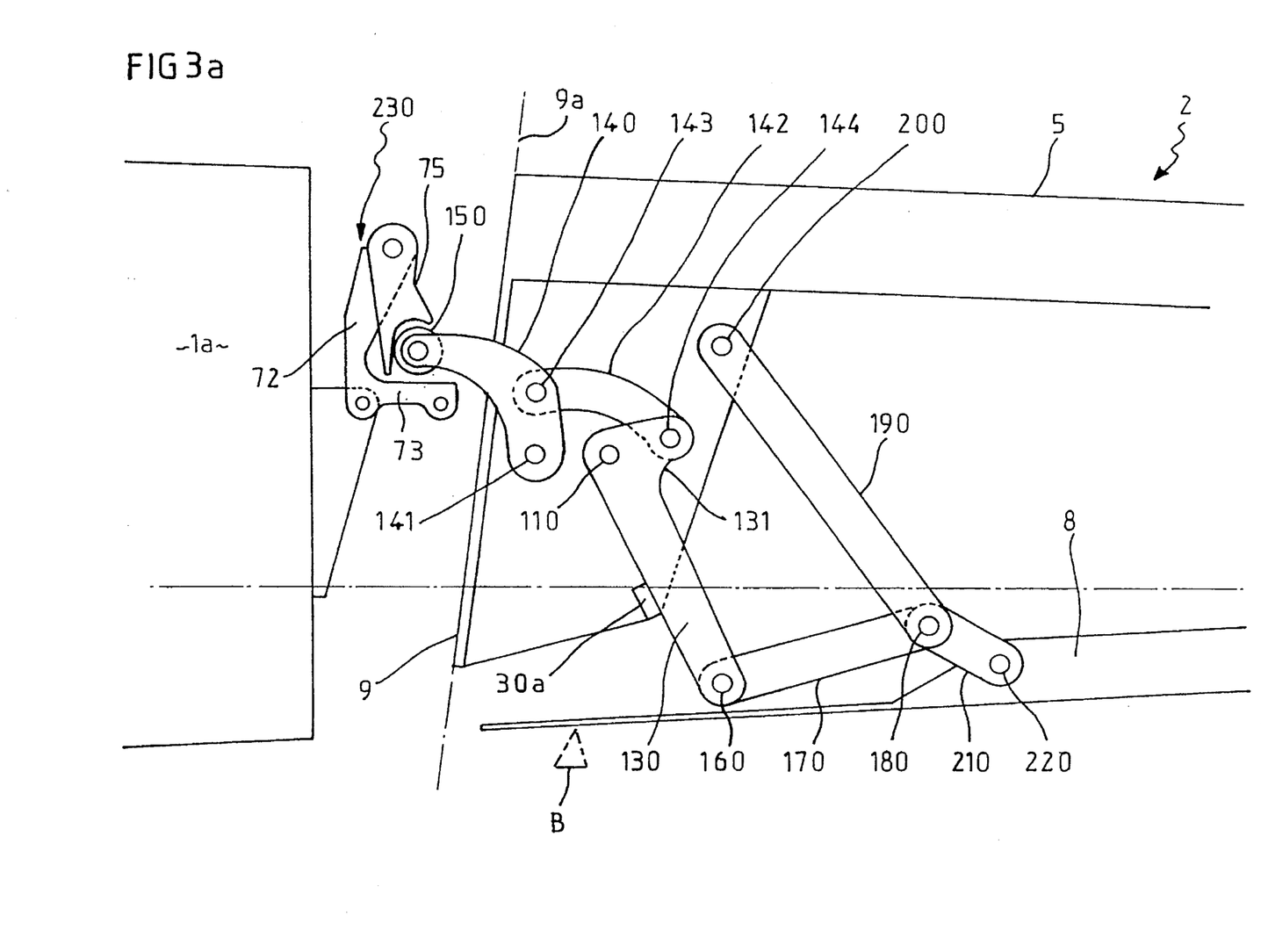
FIGS. 3a and 3b are diagrams representing a second embodiment of the auxiliary flap control means, respectively in two extreme positions.
Figure 3B:
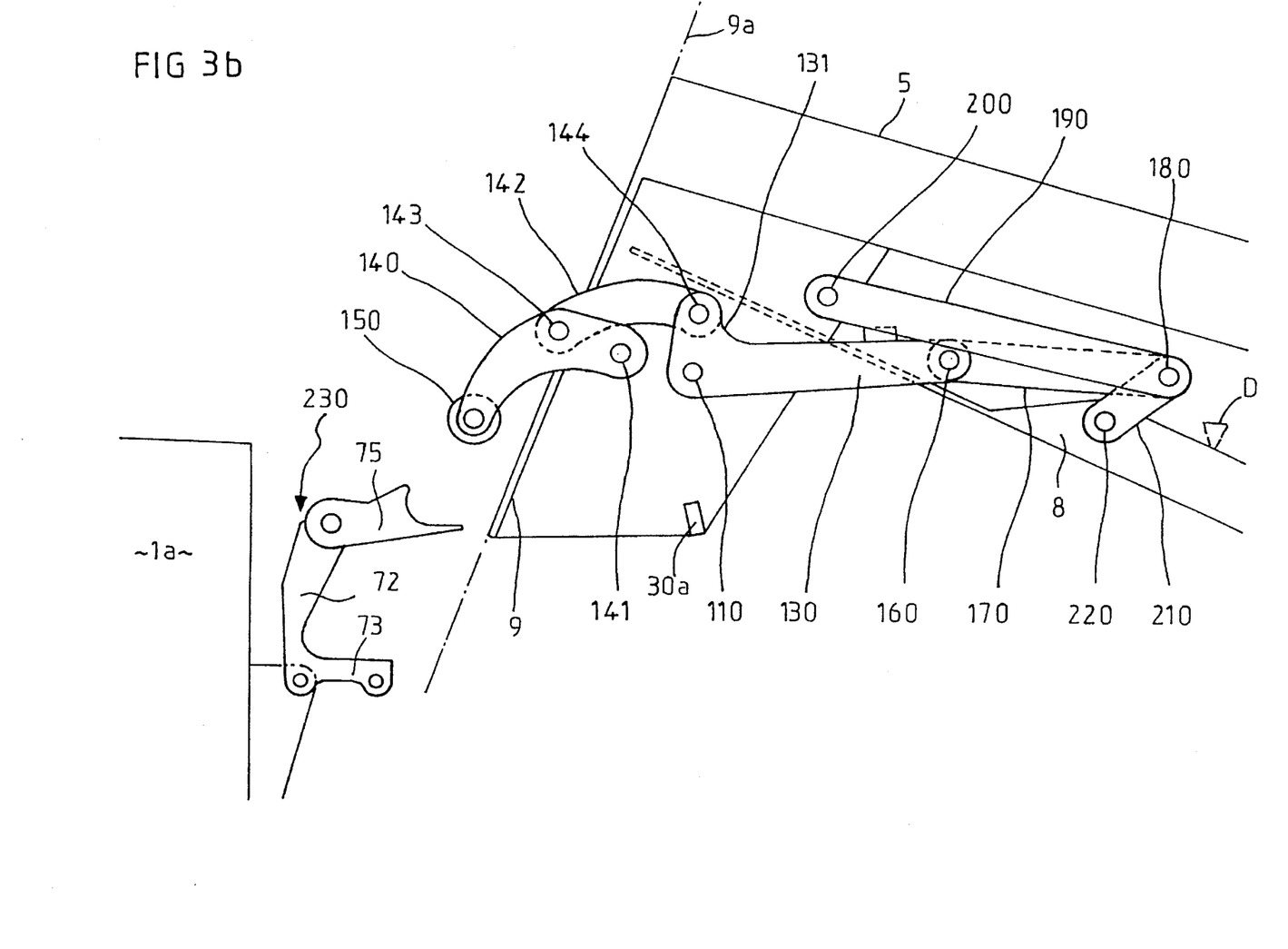

In the embodiment of FIGS. 3a–3b, the operating principle is the same as the one described above. The difference concerns only the actuating link rod which, instead of being in a single piece as represented in FIGS. 2a–2b, is made up of three elements 130, 142 and 140. The element 130, which constitutes the actuating link rod proper, is articulated, on the one hand, about a stationary pin 110 onto the gusset plate 10 and, on the other hand, about a pin 160, to a link rod 170 itself articulated, as in FIGS. 2a and 2b, to a pin 180 common to two link rods 190 and 210. The link rods 190 and 210 are articulated, in the case of one of them, about a pin 200 at the top part of the gusset plate 10 and, in the case of the other, about a pin 220 at the front part of the auxiliary flap 8.

The actuating link rod 130 proper exhibits an arm 131 on which there is articulated, about a pin 144, the abovementioned second element 142 which assumes the form of a circular arc-shaped crank, articulated at its other end to a middle pin 143 of the abovementioned third element 140. This third element 140 assumes the form of an L-shaped link rod articulated to a stationary pin 141 on the gusset plate 10 and its free end is equipped with a roller 150 extending out in front of the door spoiler 9. The L-shaped link rod 140 thus forms a moving finger which interacts with a stop piece system fixed to the stationary part 1a of the fairing and which has been denoted in general as 230, indicating only its main elements, namely a bracket 72 offering a plate 73 and a latch 75. The crank 142 forms the linkage between the actuating link rod 130 and the moving finger 140.

Figure 4:
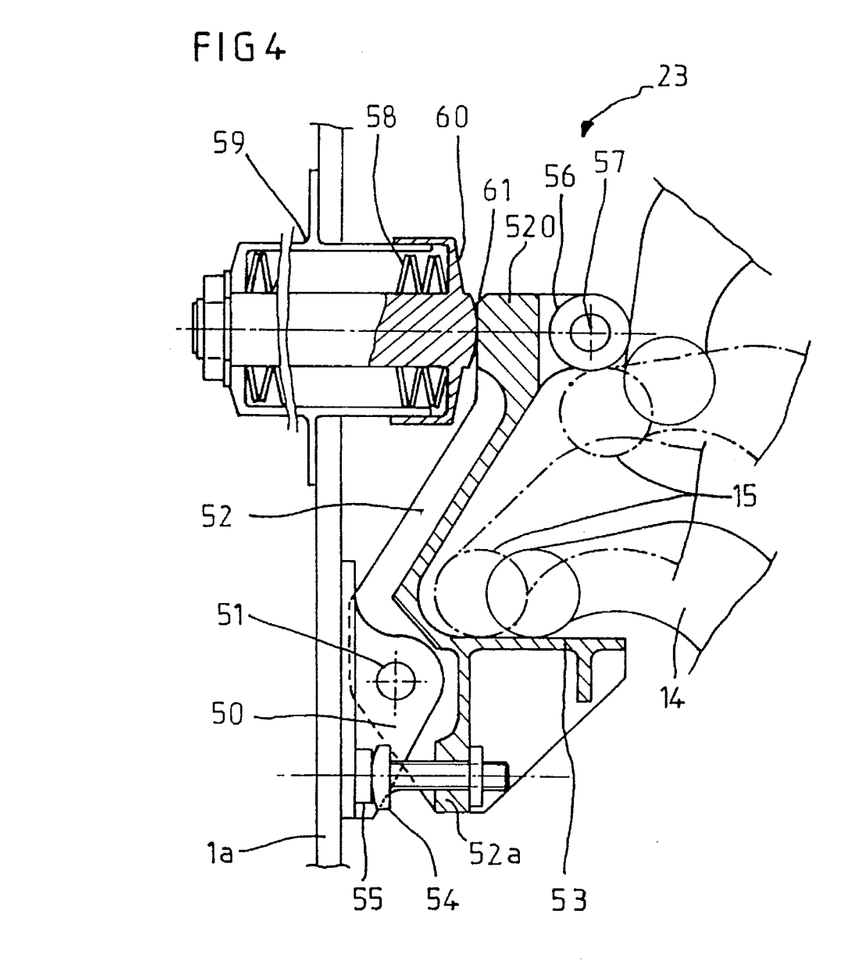
FIG. 4 represents a first embodiment of the stop piece system.
Figure 5:
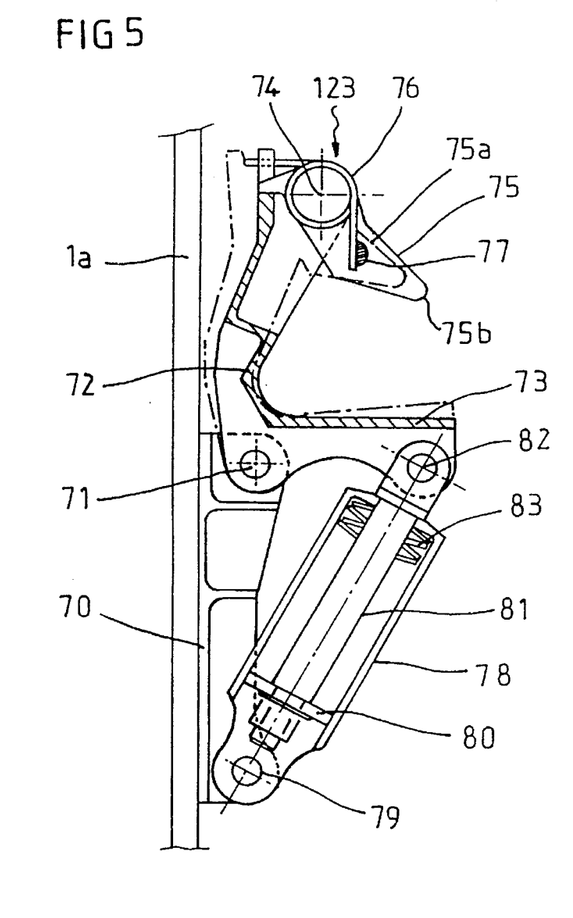
FIG. 5 represents a second embodiment of the stop piece system.

The stop piece system 230 which will be described in more detail with reference to FIGS. 6a to 6g represents the preferred embodiment, simpler variations of which are represented in FIGS. 4 and 5.

In FIG. 4, the stop piece system denoted generally as 23 is made up by a one-piece bracket 52, in the overall shape of a C, articulated at its lower part to a pin 51 carried by a support 50 fixed to the stationary part 1a of the fairing. The bracket 52 exhibits a lower plate 53 intended to act as a support for the roller 15 of the flap control system. A bolt 54 for adjusting the inclination of the bracket 52 passes through a tongue 52a situated at its lower part, the head of the adjustment bolt 54 bearing on a stop piece 55. Above the plate 53, the bracket 52 exhibits a snout 520 ending in a roller 56 rotating about a pin 57 and intended to interact with the roller 15 of the flap control system when the reverser door 2 opens (as is represented in broken line), the roller 56 of the snout 520 then being used to cause the link rod 14 to tilt (see FIG. 2a). The snout 520 is urged to the right of FIG. 4 by an elastic mechanism made up of a hollow body 59 fixed to the stationary part 1a and with respect to which a piston 60 urged by a stack of elastic washers 58 can slide against the rear face 61 of the bracket snout 520. This elastic mechanism makes it possible to absorb untimely loading and take account of the necessary operational clearances, it being possible for there to be a slight retracting movement of the bracket 52 in the counterclockwise direction against the action of the stack of elastic washers 58.

In the embodiment of the stop piece system 123 represented in FIG. 5, the bracket 72 is articulated at its bottom part about a pin 71 on a support 70 fixed to the stationary part 1a of the fairing. On the top part of the bracket 72 there is mounted, so that it can tilt about a pin 74, a stop piece latch 75 urged into a projecting position by a coil spring 76 wound around the pin 74 and acting on a stub 77 of the latch 75.

This latch 75 of triangular overall shape has its end 75b rounded.

In this embodiment, too, provision has been made for a possibility of displacing the bracket 72 about the pin 71 in order to respond to abnormal stresses by virtue of an elastic member mounted between a pin 79 of the stationary support 70 and a pin. 82 situated under the plate 73 of the bracket 72, this elastic member including a cylinder 78 in which there may slide a piston 80–81, a spring 83 being interposed between them.

To return to the preferred embodiment of the stop piece system according to the invention, denoted in general as 230 in FIGS. 3a, 3b and 6a to 6g, use is made of a system similar to the one of FIG. 5 (and the common parts have therefore been denoted with the same reference numerals), except for the moving latch 175 which has a different configuration. This moving latch 175 at its free end exhibits a concave part 176 ending in a bearing finger 177, which concavity 176 has a radius slightly greater than that of the roller 150 with which the latch 175 is to interact.

The operation of the embodiment represented in FIGS. 6a to 6g will be described briefly.

Figure 6A:
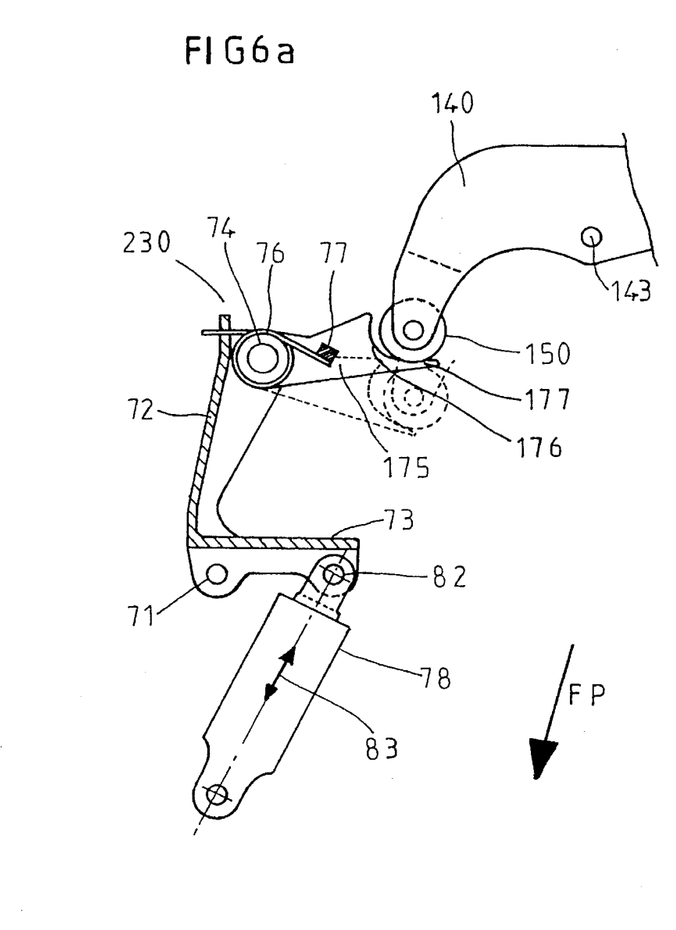
FIGS. 6a to 6g represent a preferred embodiment of the stop piece system showing the various phases in its operation.
Figure 6B:
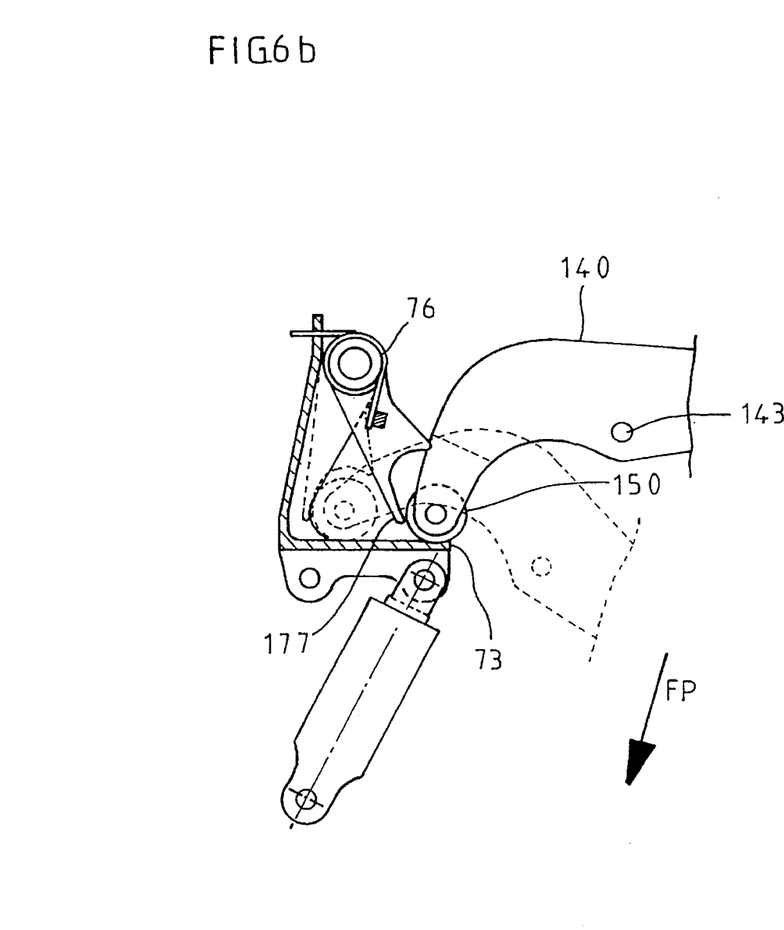

FIG. 6a shows the stop piece system 230 in the standby position when the reverser doors 2 are open.

At the end of closure of the doors (arrows FP), the roller 150 of the link rod 140 comes to bear on the finger 177. The latch 175 is then driven downward and tilts about the pin 74 until the roller 150 comes to bear against the plate 73. In this position (FIG. 6b), the finger 177 is still in contact with the roller 150 against the action of its return spring 76 but the link rod 140 has not yet tilted. With the door closing movement continuing while the roller 150 is bearing against the plate 73, the link rod 140 tilts and the roller 150 rolls over the plate 73 to the end of the latter, pushing the latch 175 back further (position in broken line in FIG. 6b).

Figure 6C:
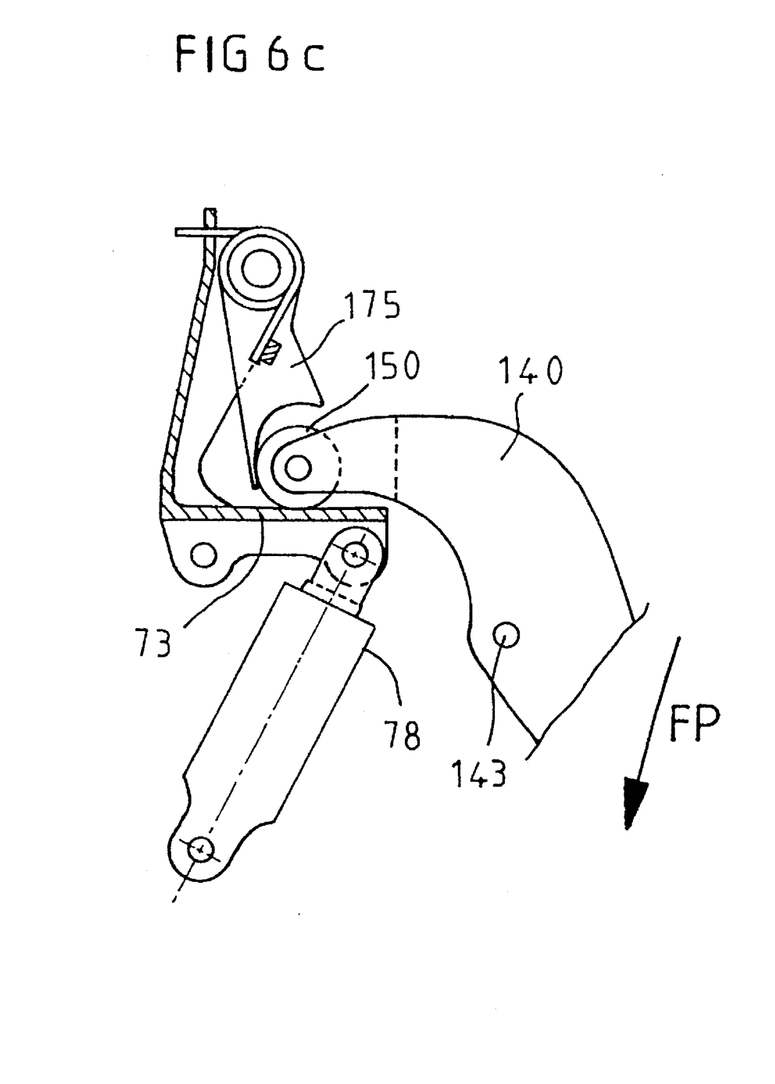
Figure 6D:
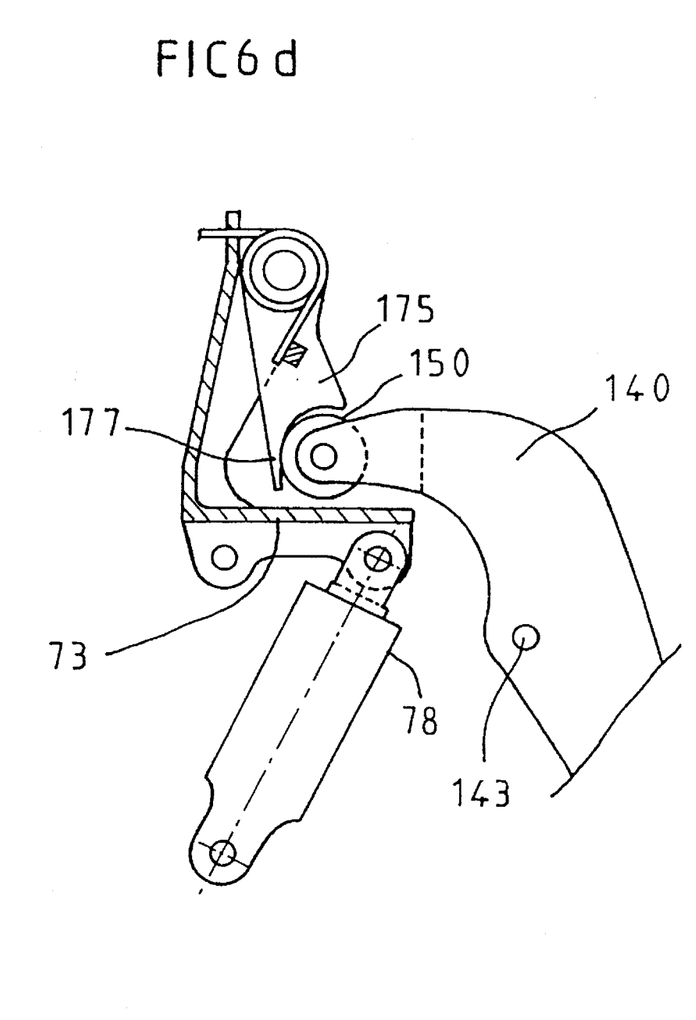
Figure 6E:
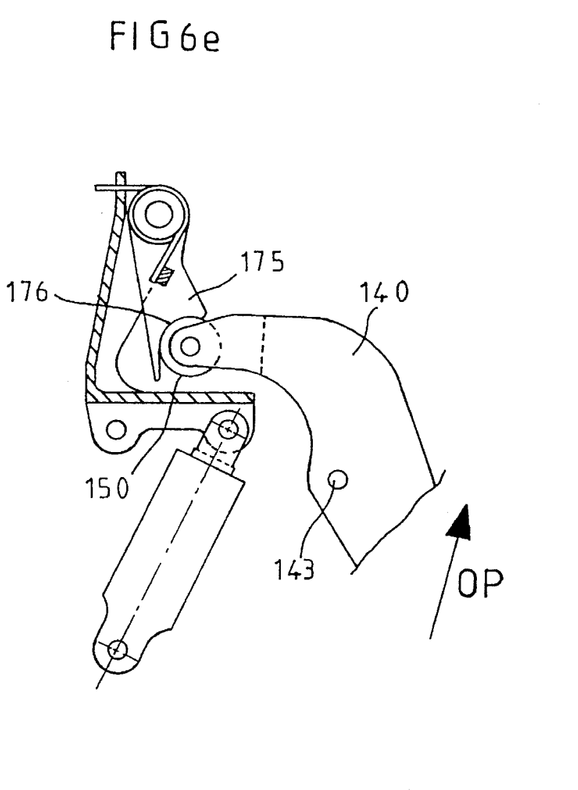
Figure 6F:
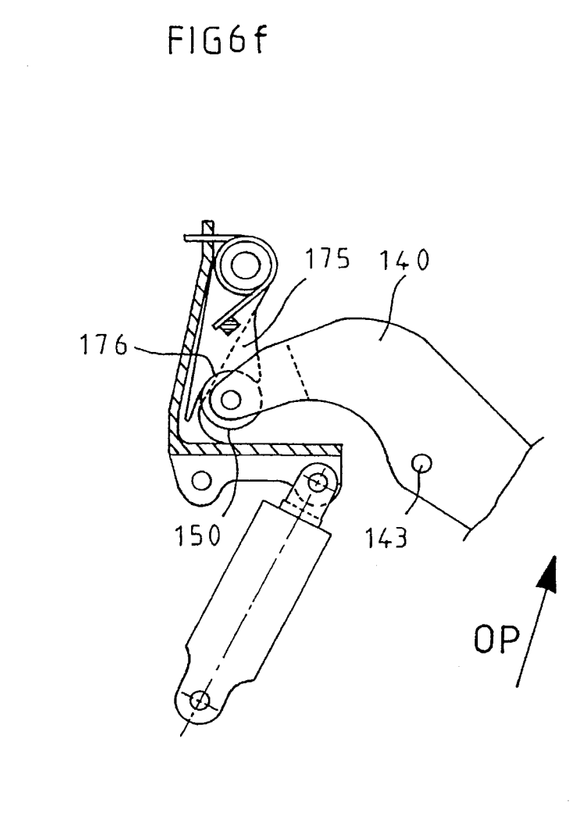

At the moment when the link rods which were locking the flap 8 in the door non-obstructing position cross the neutral point line, the position of the link rod 140, of the roller 150 and of the latch 175 is that of FIG. 6c and, in the state of having gone past the neutral point, the position is that of FIG. 6d, which corresponds to the position in solid line of FIG. 1. In this case, the roller 150 no longer rests on the plate 73 but against the finger 177.

Figure 6G:
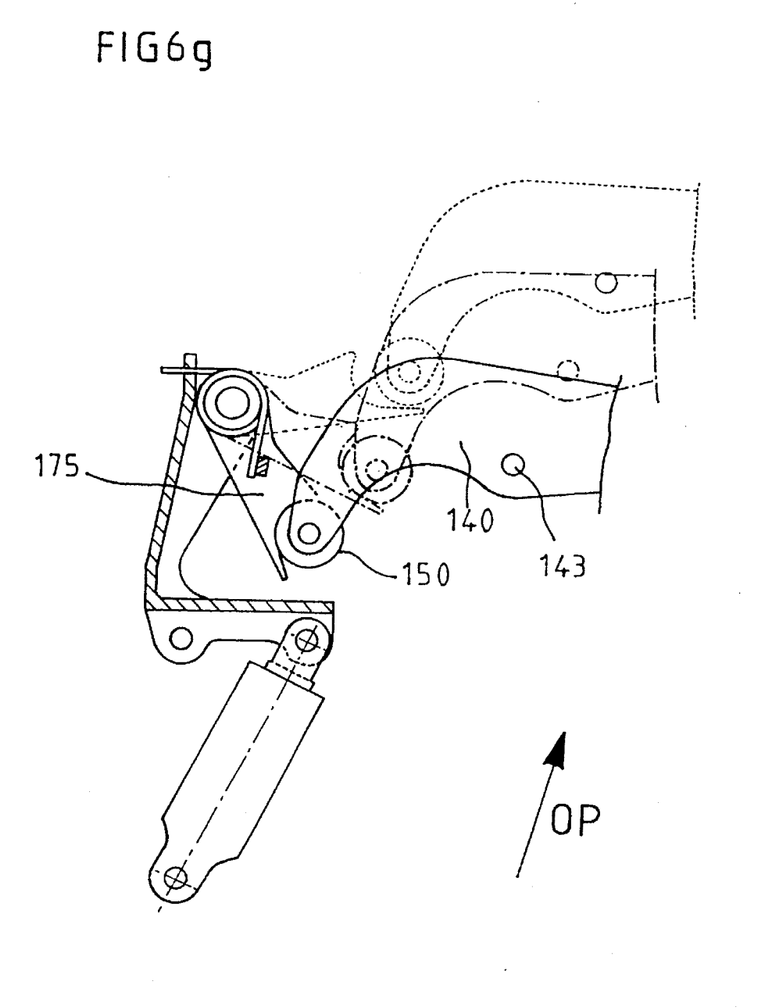

At the beginning of the door opening movement (arrow OP—FIG. 6e—), the roller 150 enters the concave part 176 of the latch, which it causes to retract (FIG. 6f) while the link rod 140 starts to tilt. With the movement continuing, the roller 150 is retained by the latch 175 which starts to rise back up, whilst the rear part of the link rod lifts up, which leads to the complete tilting of the latter (FIG. 6g). When the set again reaches the position of FIG. 6a, the latch 175 completely releases the roller 150 of the actuating link rod, and the door 2 opens fully.

We claim:

1. A thrust reverser for a jet aircraft engine including a fairing surrounding the engine unit and together with the latter forming an annular duct for the flow of the gases, said reverser being made up of a series of doors which are articulated to the fairing so that they can move between a thrust-reversal position in which the doors are deployed so as to free, in the fairing, openings for diverting the gases while at least partially closing off the annular duct, and a cruise position in which the doors are made non-obstructing so as to close the diversion openings and constitute part of the fairing, said door being equipped on the upstream part (in the direction of flow of the gases) of their internal face with at least one auxiliary flap articulated to the inside of the door and intended, in the cruise position, to be moved away from the internal wall of the door in order to align itself with the external surface of the annular duct, while in the door-deployed position, said auxiliary flap is folded back against the internal wall of the door, the displacement of the auxiliary flap between these two positions being achieved by a means for controlling the flap interacting, at the moment of opening and closing the door, with a stop piece system carried by the stationary part of the fairing, said reverser being one wherein the means for controlling the flap is made up by a set of link rods comprising a first link rod which is articulated to the upstream end of the flap and attached by an articulation pin at the end of a second link rod itself articulated at its other end to the inside of the upstream end of the door, a third link rod articulated at one of its ends to the articulation pin between the first and second link rods, while its other end is articulated at the end of an actuating link rod which is articulated so that it can pivot about a fixed pin of the door, this actuating link rod providing the displacement of the set of link rods by its interaction with the stop piece system carried by the stationary part of the fairing, said set of link rods providing an immobilization of the flap in each of the two positions which it can assume, by extending, at the end of travel, beyond a neutral point between two of the consecutive link rods of the set of link rods.

2. The thrust reverser as claimed in claim 1, wherein the amount by which each of the neutral points between the two consecutive link rods of the set of link rods can be exceeded is limited by the actuating link rod bearing against travel-limiting stops integral with the door.

3. The thrust reverser as claimed in claim 1, wherein the auxiliary flap is held against the internal wall of the door, when the door is in the deployed position, by the exceeding of a neutral point between the actuating link rod and said third link rod articulated to the end of said actuating link rod.

4. The thrust reverser as claimed in claim 1, wherein the auxiliary flap is held in its position away from the internal wall of the door when the latter is in the non-obstructing position by the exceeding of a neutral point between said first and second link rods which are articulated, in the case of one of them, to the upstream end of the door, and, in the case of the other, to the auxiliary flap.

5. The thrust reverser as claimed in claim 1, wherein the actuating link rod comprises, on either side of the pin via which it is articulated to the door, a first arm which is articulated to said third link rod of the set of link rods and a second arm which projects with respect to the upstream edge of the door and is intented to interact with said stop piece system.

6. The thrust reverser as claimed in claim 1, wherein the actuating link rod articulated to said stationary pin of the door, exhibits an arm attached by a linkage to a moving finger which is articulated to a stationary pin of the door, and has one free end projecting with respect to the upstream edge of the door to interact with said stop piece system, said linkage being, on the one hand, articulated so that it can pivot on said arm of the actuating link rod and, on the other hand, articulated so that it can pivot to the moving finger at a point situated between the stationary pivot pin of the finger and the projecting free end of the latter, said linkage transmitting the movement from the finger to the actuating link rod.

7. The thrust reverser as claimed in claim 1, wherein the stop piece system carried by the stationary part of the fairing and with which the means for controlling the auxiliary flap interacts includes a bracket, part of which extends in the direction of the door to act as an arrester stop piece for the part of the means for controlling the flap which projects with respect to the upstream edge of the door, said bracket exhibiting, above its part forming a stop piece, a projecting snout which, when the door is being opened, acts on the actuating link rod of the flap to force it to tilt.

8. The thrust reverser as claimed in claim 1, wherein the stop piece system carried by the stationary part of the fairing and with which the means for controlling the auxiliary flap interacts includes a bracket, part of which extends in the direction of the door to act as an arrester stop piece for the part of the means for controlling the flap which projects with respect to the upstream edge of the door, said bracket exhibiting, above its part forming a stop piece, a projecting snout which, when the door is being opened, acts on the actuating link rod of the flap to force it to tilt, the projecting snout being stationary with respect to the bracket.

9. The thrust reverser as claimed in claim 1, wherein the stop piece system carried by the stationary part of the fairing and with which the means for controlling the auxiliary flap interacts includes a bracket, part of which extends in the direction of the door to act as an arrester stop piece for the part of the means for controlling the flap which projects with respect to the upstream edge of the door, said bracket exhibiting, above its part forming a stop piece, a projecting snout which, when the door is being opened, acts on the actuating link rod of the flap to force it to tilt, the projecting snout being made up by the latch mounted so that it can tilt on a pin of the bracket and urged by a spring into the out position above the part of the bracket forming a stop piece.

10. The thrust reverser as claimed in claim 1, wherein the stop piece system carried by the stationary part of the fairing and with which the means for controlling the auxiliary flap interacts includes a bracket, part of which extends in the direction of the door to act as an arrester stop piece for the part of the means for controlling the flap which projects with respect to the upstream edge of the door, said bracket exhibiting, above its part forming a stop piece, a projecting snout which, when the door is being opened, acts on the actuating link rod of the flap to force it to tilt, the free end of the latch having a concave shape ending in a bearing finger, this free end of the latch interacting and remaining in contact with the end of the projecting part of the means for controlling the flap during all of the manoeuvres at the beginning of opening and end of closing the door.

11. The thrust reverser as claimed in claim 1, wherein the stop piece system carried by the stationary part of the fairing and with which the means for controlling the auxiliary flap interacts includes a bracket, part of which extends in the direction of the door to act as an arrester stop piece for the part of the means for controlling the flap which projects with respect to the upstream edge of the door, said bracket exhibiting, above its part forming a stop piece, a projecting snout which, when the door is being opened, acts on the actuating link rod of the flap to force it to tilt, and said bracket being mounted on the stationary part of the fairing by means of an elastic damper member allowing a slight excursion of the bracket.

* * * * *